United States Patent

Sack et al.

[11] 4,007,048
[45] Feb. 8, 1977

[54] DARK RED TRANSPARENT REFRACTORY GLASS

[75] Inventors: Werner Sack, Mainz; Herwig Scheidler, Finthen, both of Germany

[73] Assignee: Jenaer Glaswerk Schott & Gen., Mainz, Germany

[22] Filed: June 17, 1975

[21] Appl. No.: 587,675

[30] Foreign Application Priority Data

June 20, 1974 Germany .......................... 2429563

[52] U.S. Cl. ................................. 106/39.7; 65/33; 106/39.8; 106/52

[51] Int. Cl.² ...................... C03B 32/00; C03C 3/22

[58] Field of Search ......... 65/33; 106/39 DV, 39.7, 106/39.8, 52

[56] References Cited

UNITED STATES PATENTS

| | | | |
|---|---|---|---|
| 3,617,317 | 11/1971 | Sack et al. ...................... | 106/39 DV |
| 3,642,504 | 2/1972 | Petzuld et al. ................. | 106/39 DV |
| 3,677,785 | 7/1972 | Horikawa et al. ............. | 106/39 DV |
| 3,741,740 | 6/1973 | Pirooz ............................. | 65/33 X |
| 3,749,561 | 7/1973 | Kuwayama ..................... | 65/33 X |
| 3,788,865 | 1/1974 | Babcock et al. ................ | 65/33 X |
| 3,926,839 | 12/1975 | Reade ............................ | 106/39.7 |
| 3,962,117 | 6/1976 | Reade ............................. | 106/52 X |

*Primary Examiner*—Robert L. Lindsay, Jr.
*Assistant Examiner*—Frank W. Miga
*Attorney, Agent, or Firm*—Millen & White

[57] ABSTRACT

Glass ceramic and the process for producing a dark red glass ceramic comprising the production of basic glass by melting at about 1620° C a mixture of approximate percentages of sand 53.30%, hydrated alumina 27.15%, zirconium silicate 1.90%, titanium oxide 2.02%, lithium carbonate 7.49%, sodium carbonate 0.87%, potash 0.62%, dolomite 0.39%, barium carbonate 1.04%, barium nitrate 2.16%, zinc oxide 1.09%, manganese dioxide 0.56%, ferric oxide 0.21%, cobalt oxide 0.36%, nickel oxide 0.05% and antimony oxide 0.73%. After cooling to about 1480° C, the glass is formed into articles, and the articles further cooled to at least 700° C. The articles are then heat treated to 800° C at about ≤ 10° C/min., devitrifying the glass from 800° C to 900° C, at, for example, 0.5° C/min and cooling the article from 890° C to room temperature at, for example, 7° C/min.

15 Claims, 2 Drawing Figures

DARK RED TRANSPARENT REFRACTORY GLASS

The invention relates to a glass ceramic which is black when looked at and dark red when looked through, said glass ceramic being particularly suitable for manufacturing articles which can be locally heated.

Transparent glass ceramics are known, for example from German Patent Specifications Nos. 1,596,858 and 1,596,863. The characterizing features of glass ceramics in general and of transparent glass ceramics in particular are illustrated for example in German Patent Specification No. 1,596,858 and in the publications of W. Sack and H. Scheidler: "Einfluss von Viskositat, Phasenstabilitat und Kristallisationsverhalten auf die Herstellung von temperaturwechselbstandigem Natrium-Boro-Silicat- und Lithium-Aluminium-Silicat-Wirtschaftsglas", Part II, "Reports Pertaining to Glass Technology" 43 (1970), No. 9, Pages 359 to 368 and in: H. Scheidler and W. Sack: "Die unterschiedliche Wirkung der Keimbildner $ZrO_2$ und $TiO_2$ auf das Kristallisationsverhalten eines Lithium-Aluminium-Silicat-(Glaskeramik) Glases"; Special Paper to the 9th International Congress on Glass in Versailles, October 1971, Pages 1069 to 1085.

If plates made of glass ceramics or other glass are heated only in certain areas then mechanical stresses are set up within the plate between the heated areas and the relatively cold surrounding areas because of the thermal expansion of the heated areas. If the central portion only of a plate is heated while the surrounding peripheral portion remains relatively cold then, in the heated part, compression strains are set up and, in the peripheral area, tensile strains are obtained. The induced stresses or strains depend on the geometry of the heated zone and of the unheated zone, on the distance from the heated zone to the edge of the plate as well as on the temperature gradient between the hot central area and the cold edge.

To a first approximation, the level of maximum stress can be calculated according to:

$$\sigma = \alpha \times E \times \Delta T \times F \quad (I)$$

where:

$\sigma$ = maximum stress at the edge of the plate, $\alpha$ = average thermal expansion between the temperature of the edge and the maximum temperature of the heated zone, $E$ = modulus of elasticity, $\Delta T$ = temperature difference between the hot central portion and the cold edge, and $F$ is a factor, dependent on the geometry of the plate and on the method of heating as well as on the rate of cooling between the central area and the edge and also dependent on the variation with temperature of the values $\alpha$ and $E$ in the $\Delta T$ range.

For glass ceramics to be used for smoothtops having circular heating elements and rectangular shape, the factor F is, for example, between 1.5 and 2.5.

Therefore, it is necessary to optimize the physical characteristics of the glass ceramic so that the plates or other articles are not broken by the stresses arising during heating.

Assuming $\Delta T$ to be predetermined, then relationship (I) indicates the need for a small thermal expansion and a low modulus of elasticity E. The modulus E of all known lithium alumino - silicate glasses is approximately $9 \times 10^5$ kp/cm$^2$, so that the only variable in practice is the thermal expansion as F too must be regarded as almost constant.

Breakage of a refractory glass plate only occurs, however, if the thermally caused stresses exceed the bending strength of the glass. If it were possible to increase the modulus or rupture $\sigma_{BZ}$ by means of special measures then, as a result, the resistance of the glass to localized or partial heating would also be increased.

The values which determine resistance to partial heating are related to the so-called "heat stress factor" R of silicate materials (see "Die Keramik", Salmang-Scholze, Springer-Verlag Berlin 1968, page 334 ff).

$$R = \frac{\sigma_{BZ} \times (1 - \mu)}{\alpha \times E} \quad (II)$$

where $\mu$ = poisson's ratio which, in lithiumalumino-silicate glass is about 0.24.

It is thus useful to use this heat stress factor R as a characteristic feature of the glass since its value is decisive for determination of the resistance of the material to partial heating.

An object of the invention is to provide a glass ceramic which is particularly suitable for the manufacture of plates or other articles which are to be heated only in certain areas and which withstand the resultant stresses without breakage.

The invention provides a dark red glass ceramic which is characterised in that it has a heat stress factor R > 1000, a crystal phase concentration of h-quartz solid solutions and/or h-spodumene of at most 50% by weight, has a infrared transmission > 13% for a layer 4.5 mm in thickness and radiation having a wavelength between 1100 and 2700 nm., said glass ceramic being formed from a basic glass having the following composition calculated in percentages by weight of the following oxides:

| | |
|---|---|
| $SiO_2$ | 64.00 ± 0.30, |
| $Al_2O_3$ | 21.30 ± 0.20, |
| $Li_2O$ | 3.50 ± 0.15, |
| $Na_2O$ | 0.60 ± 0.15, |
| $K_2O$ | 0.50 ± 0.10, |
| $BaO$ | 2.50 ± 0.50, |
| $CaO$ | 0.20 ± 0.20, |
| $MgO$ | 0.10 ± 0.10, |
| $ZnO$ | 1.50 ± 0.50, |
| $TiO_2$ | 2.30 ± 0.10, |
| $ZrO_2$ | 1.60 ± 0.10, |
| $MnO_2$ | 0.65 ± 0.15, |
| $Fe_2O_3$ | 0.23 ± 0.03, |
| $CoO$ | 0.37 ± 0.05, |
| $NiO$ | 0.06 ± 0.02, and |
| $Sb_2O_3$ | 0.85 ± 0.15, | heat-treated at a temperature within the range of from 800° to 900° C.

The fact that the object can be achieved with the glass ceramic according to the invention is all the more surprising since it was previously regarded as impossible to produce a transparent glass ceramic with a sufficiently high strengths (see S. W. Freimann, "The Glass Industry", Sept. 73, Pages 12 - 16).

The transparent glass ceramic of the invention is distinguished from previous glasses by special physical features which offer considerable advantages for its use. In addition to its good melting behaviour and its suitability for finishing by rolling, in the manufacture of plate glass, this glass can be used particularly for the construction of partially heated components. Thus this transparent, dark red glass in the form of large flat plates is outstandingly suitable for smoothtops for electric and gas ovens with continuous operating temperatures of 700° C and for temperatures of up to 800° C for shorter periods.

The most important physical features which make the glass ceramic according to the invention superior to known glass ceramics are as follows:

1. A wide ceramization range of from 800° to 900° C with good transparency which is largely independent of the crystallization time. As a result, production difficulties which are inevitable with a restricted crystallization range are avoided.

2. Due to the presence of at most 50% by weight crystalline glass and of the slow percentage increase in the concentration of the crystal phase a relatively small viscosity $\eta \leq 1 \times 10^{10} P$ is achieved during ceramization before the incidence of crystallisation. As a result, very good flatness is achieved even of large-area plates, thus facilitating production and reducing expense. The wide devitrification range of from 800° C to 900° C is also of assistance in this respect.

3. Coloration of the transparent glass ceramic according to the invention is maintained so that, when used for example as an electrically heated cooking surface, the glass appears black when looked at and dark red when looked through. As a result, under operational conditions, glowing spiral heating elements are visible through the cooking surface, giving an additional optical safety mechanism.

4. When used as a smoothtop, the heat transmission of the glass ceramic in the region of from 1 to 3 $\mu$m causes a shorter boiling time which depends on the size of the saucepan but may be as much as 30% in relation to glass ceramic smoothtops which are opaque in the visible range and are impenetrable to heat radiation in the above-mentioned wave length range. At the same time the relatively good heat conduction of the transparent glass ceramic according to the invention of $> 2$ kcal/m $\times$ h $\times$ grd is of advantage at operating temperatures of from 300° to 700° C.

5. There is no disturbing discoloration in longterm operation, as can be observed in opaque white glass ceramic cooking surfaces.

6. The modulus of rupture $\sigma_{BZ}$ of previously known transparent glass ceramics has been about the same as for conventional commercial glass, i.e. from 550 to 650 kp/cm$^2$. This compares unfavorably with values of from 1000 to 1200 kp/cm$^2$ for opaque glass ceramics or for the opaque form of the above-mentioned composition (at devitrification temperatures which are from 200° to 300° C above the crystallization temperature for the transparent form).

The modulus of rupture of the transparent glass ceramic according to the invention is at a value of 700 ± kp/cm$^2$ after a single devitrification cycle following the moulding or rolling process. If then this crystallization cycle is repeated which is equal to a lengthening of the devitrification time, then the modulus of rupture rises surprisingly up to almost 1700 ± 50 kp/cm$^2$ after six crystallization cycles. The linear coefficient of thermal expansion $\alpha \times 10^7$ (20° to 700° C)/° C thus rises from 2 ± 1 after one transformation cycle to 14 ± 1 after six cycles, without any great reduction of the transparency in the visible region as well as in the infra-red region up to 4 $\mu$m wavelength. Also with regard to crystalline size (which is important for transparency) and with regard to the concentration of crystalline phase of about 50% by weight no determinable change has occurred. The originally available h-quartz solid solution phase decreases constantly after one crystallization cycle with increasing devitrification time and is converted eventually into an h-spodumene crystal phase so that, after six crystallization cycles, a transparent glass ceramic is present containing only h-spodumene. Such a transformation, i.e. the continuous changeover from a transparent glass ceramic containing h-quartz solid solutions into a transparent glass ceramic containing only h-spodumene, has not previously been known. In general the changeover into a glass ceramic containing h-spodumene has been connected with complete disappearance of the transparent nature of the glass; i.e. such glass has previously been opaque. The density of the glass decreases from 2.556 to 2.542 g/cc.

A detailed explanation of the cause of the surprising increase in strengths with almost the same crystalline size and crystal quantity as well as transparency is not yet available. Obviously continuous re-structuring of the two crystal phases takes place leading to the occurrence of advantageous micro stresses between the crystallites and the residual phase, which macroscopically increase the strengths as a whole.

Dependent on the intended field of application the properties of the glass ceramic can be extensively controlled; they can, for example, be influenced towards particularly high values of modulus of rupture or toward particularly low values of thermal expansion by the nature of the crystallization process, for example, by the number of crystallization cycles.

If the same glass composition is transformed into the opaque form, for example, by means of heating for one hour at 770° C to initiate nucleation, heating to 1150° C at any speed, holding for two hours at this temperature and quick cooling (200° to 300° C/h) to room temperature, an opaque, light blue glass ceramic is formed with h-spodumene as the crystal phase and with a coefficient of thermal expansion $\alpha \times 10^7$ (20° to 700° C) ° C of + 16 ± 1, which is only a little over the coefficient of thermal expansion of the transparent form after six crystallization cycles and with a density of 2.561 g/cc. in relation to 2.49 g/cc of the basic glass. The modulus of rupture of this opaque glass ceramic of the same basic composition is about 1200 kp/cm$^2$.

The dependence of the modulus of rupture and of the linear coefficient of thermal expansion on the number of crystallization cycles or on the crystallization time is decisive for the commercial value of the transparent glass ceramic. This is of particular importance when large-area plates made of this glass ceramic are not uniformly heated, as for example with partially electrically heated smoothtops.

Figure 1:
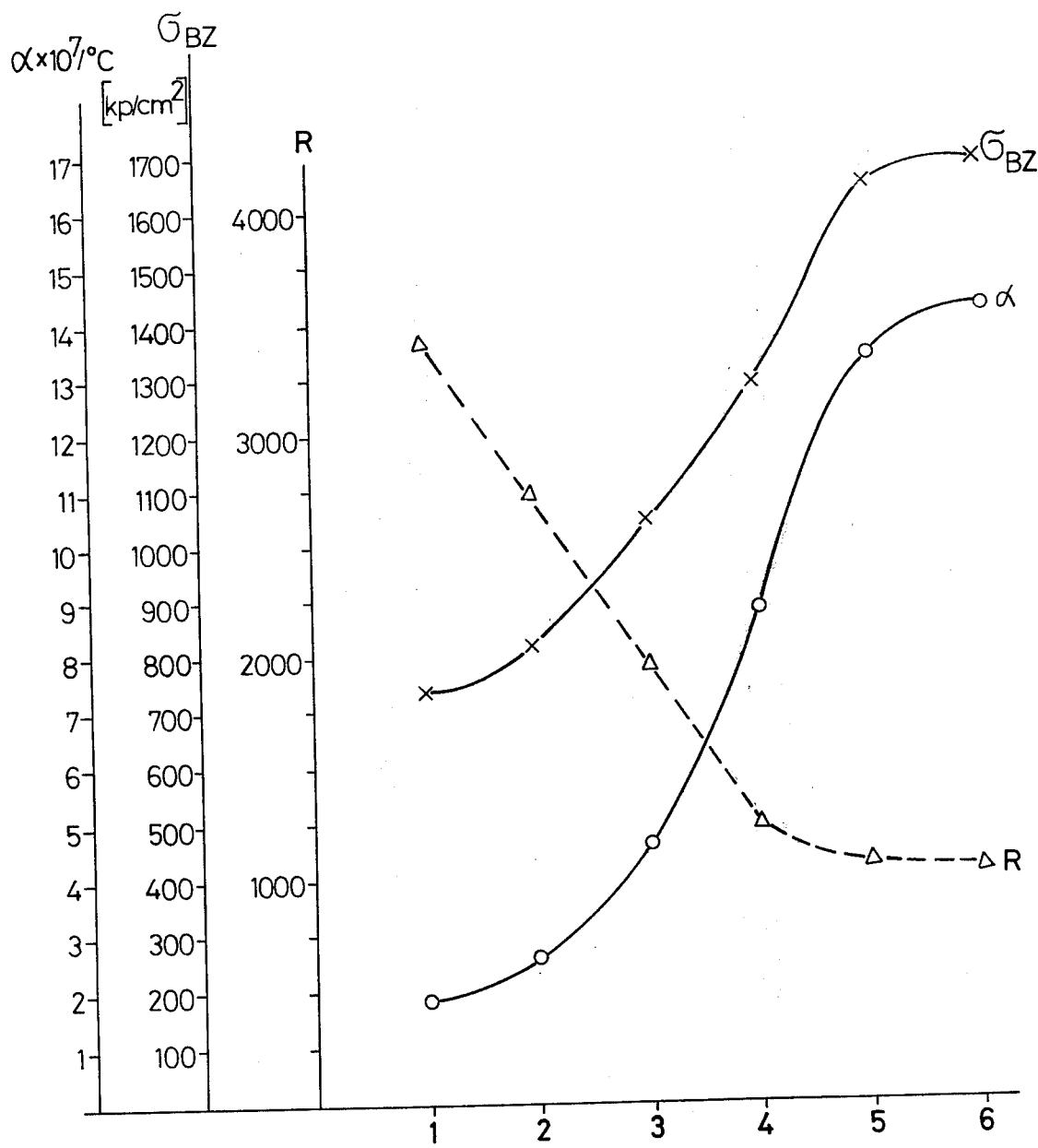
FIG. 1 shows the relationship of the modulus of rupture and of the coefficient of thermal expansion in dependence on the number of crystallization cycles.
Figure 2:
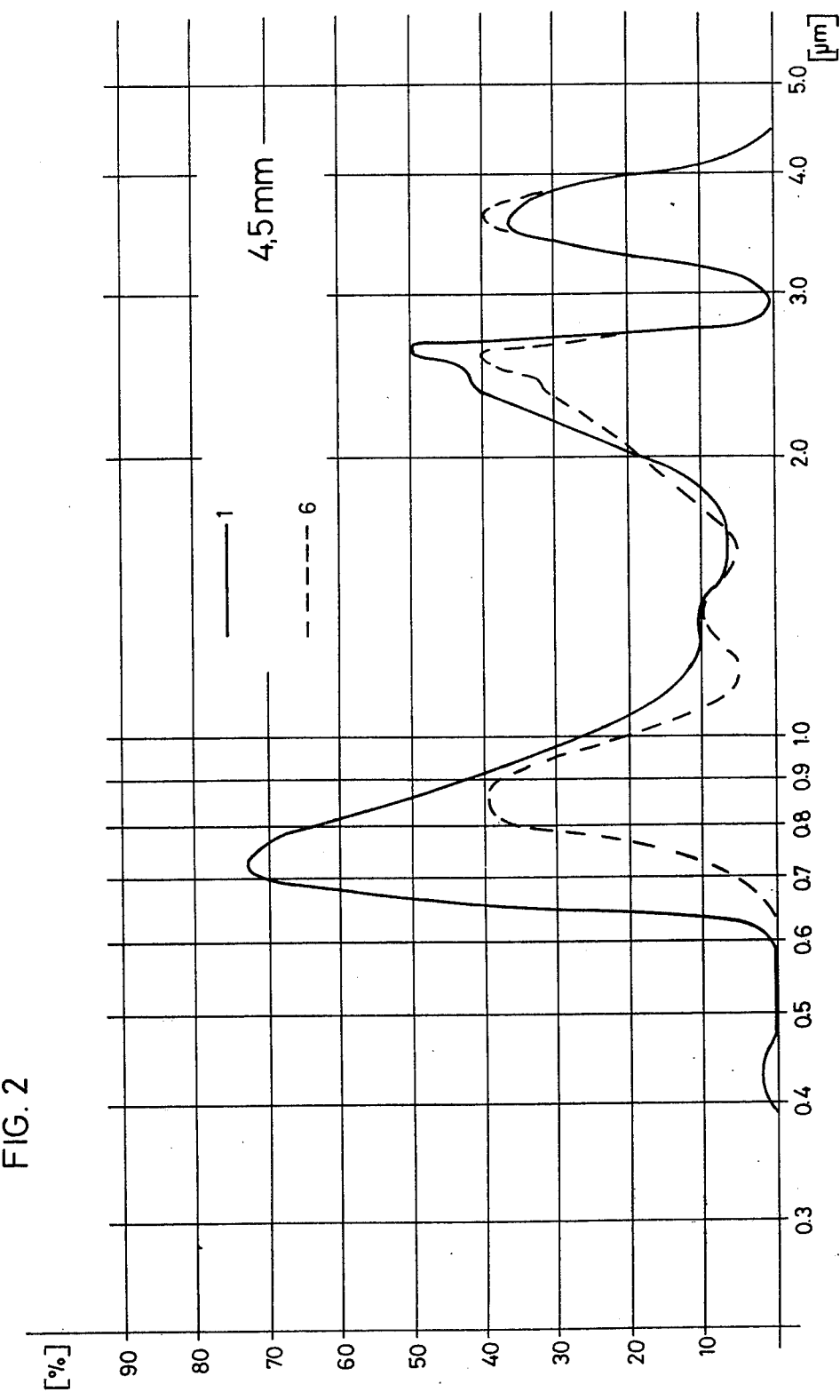
FIG. 2 shows the transmission of a sample of ceramic glass 4.5 mm. thick after one and after six crystallization cycles in the range of 0.4 to 4 $\mu$m.

If the heat stress factors are calculated for the various samples of glass ceramic after the number of crystallization cycles stated in Table 1, then the values shown in Table 1 are plotted to provide curve R in FIG. 1. For the purpose of calculation, E was taken to be $9 \times 10^5$ kp/cm$^2$, and $\mu$ was 0.24.

The values for $\alpha$ and $\sigma_{BZ}$ were taken from the appropriate curves of FIG. 1 and are shown in Table 1.

Properties of the glass ceramic according to the invention are as follows:

a) in the glassy state
$\gamma \times 10^7$ (20 to 300° C)/° C = 43 ±1
$T_g$ (° C); $\eta$ ca. $10^{13.5}$ P = 680 ±5
$V_A$ (° C); $\eta = 10^4$ P = 1290 ±10
Density (g/cc.) = 2.49 ± 0.05
position of the DTA-Peak$_{max}$ in ° C at a heating rate of 6 to 6.5° C/min = 840 ±5 b) in the crystalline state in dependence on the number of crystallization cycles.

Crystallization Cycle (Example):
Heating: from room temperature to 800° C at about 10° C/min.,
Devitrification: from 800° C to 890° C at about 0.5° C/min. and
Cooling: from 890° C to room temperature at about 7° C/min.

Table 1

| Features | Number of Crystallization cycles | | | | | |
|---|---|---|---|---|---|---|
| | 1 | 2 | 3 | 4 | 5 | 6 |
| $\alpha \times 10^7$ (20–700° C)/° C | + 1.8 | + 2.5 | + 4.5 | + 8.7 | + 13.3 | + 14.1 |
| $\sigma_{BZ}$ (kp/cm$^2$) | 730 | 810 | 1040 | 1280 | 1640 | 1680 |
| Heat Conductivity $\lambda$ (kcal/m.h.grd) 300 – 700 ° C | → | | >2 | | | |
| Heat stress factor R | 3423 | 2735 | 1950 | 1241 | 1041 | 1006 |
| Density (g/cc.) | 2.556 | 2.556 | 2.553 | 2.548 | 2.543 | 2.542 |
| $\tau$ for 4.5mm thickness (%) at 700 nm. | 50 | | 30 | | | 16 |
| 1100 nm. | 20 | | 20 | | | 17 |
| 2000 nm. | 13 | | 14 | | | 13 |
| 2700 nm. | 48 | | 48 | | | 40 |
| Crystalline Phase Content | h-Q-SS | h-Q-SS | h-Q-SS/ h-Sp. | h-Q-SS/ h-Sp. | h-Sp. | h-Sp. |
| Crystal Phase Content (wt. %) | 45 | 46 | 40/5 | 20/20 | ~40 | ~40 |
| Hydrolysis accg. to DIN 12111 | 1st Class | | | | | |
| Acid Resistance accg. to DIN 12116 | 2nd Class | | | | | |
| Alkali Resistance accg. to DIN 52322 | 1st Class | | | | | | h-Q-SS = h-quartz solid solutions
h-Sp. = h-spodumene

An example is given below for the production of a basic glass according to the present invention and for the manufacture of articles from this basic glass.

To produce 300 kg. of glass a batch consisting of a mixture of the following raw materials is used:

| | % by weight | |
|---|---|---|
| 190.50 kg. | 53.30 | sand, |
| 97.60 kg. | 27.15 | hydrated alumina, |
| 6.80 | 1.90 | zirconium silicate, |
| 7.20 | 2.02 | titanium oxide, |
| 26.80 | 7.49 | lithium carbonate, |
| 3.10 | 0.87 | sodium carbonate, |
| 2.20 | 0.62 | potash, |
| 1.40 | 0.39 | dolomite, |
| 3.70 | 1.04 | barium carbonate, |
| 7.70 | 2.16 | barium nitrate, |
| 3.90 | 1.09 | zinc oxide, |
| 2.00 | 0.56 | manganese dioxide, |
| 0.72 | 0.21 | ferric oxide, |
| 1.287 | 0.36 | cobalt oxide, |
| 0.185 | 0.05 | nickel oxide, and |
| 2.60 | 0.73 | antimony oxide. |

The batch is melted at 1620° C in 14 to 16 portions of equal size in a quartz crucible holding 120 l., the melt is refined for from 13 to 15 h. at 1620° C and for from 5 to 7 h. at 1550° C and cooled in from 2 to 3 h. to 1480° C. The glass is then made into articles by means of a hand press. The articles themselves are cooled to room temperature in a regulated electric cooling oven from 690° C, beginning with a cooling rate of from 60° to 100° C/h, — depending on the thickness of the walls of the articles.

The basic glass has the following composition in percentages by weight, calculated on an oxide basis:

| | |
|---|---|
| SiO$_2$ | 64.00 ± 0.30, |
| Al$_2$O$_3$ | 21.30 ± 0.20, |
| Li$_2$O | 3.50 ± 0.15, |
| Na$_2$O | 0.60 ± 0.15, |
| K$_2$O | 0.50 ± 0.10, |
| BaO | 2.50 ± 0.50, |
| CaO | 0.20 ± 0.20, |
| MgO | 0.10 ± 0.10, |
| ZnO | 1.50 ± 0.50, |
| TiO$_2$ | 2.30 ± 0.10, |
| ZrO$_2$ | 1.60 ± 0.10, |
| MnO$_2$ | 0.65 ± 0.15, |
| Fe$_2$O$_3$ | 0.23 ± 0.03, |
| CoO | 0.37 ± 0.05, |
| NiO | 0.06 ± 0.02, and |
| Sb$_2$O$_3$ | 0.85 ± 0.15, |

The articles formed of the basic glass are then subjected to the heat treatment referred to above.

In the final glass ceramic, the total crystalline phase content is usually at least 30%, preferably at least 40%. The size of the crystals is usually in the range of 400 to 1000, especially 500 to 700 A.

The heat stress factor R which is greater than 1000 in the final product is preferably more than 2500.

The heating of the shaped glass from room temperature to 800°–900° C can be conducted at 10° C/min., it also is possible to heat at a rate of from 1° to 10° C/min.

The cooling rate can be from 1° to 7° C/min within a temperature range of 900° to 750° C and from 1° to 200° C/min. within a temperature range of 750° C to room temperature.

The preceding examples can be repeated with similar success by substituting the generically or specifically described invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Dark red, transparent glass ceramic, particularly for the manufacture of articles which can be locally heated, said glass ceramic having a "heat stress factor" $R > 1000$, a crystal phase content being at least 30% and not more than 50% by weight, and a infrared transmission $\geq 13\%$ in a layer of 4.5 mm. in thickness in the wave length range of from 1100 to 2700 nm. and formed from a basic glass consisting essentially of in percent by weight, calculated on an oxide basis:

| | |
|---|---|
| $SiO_2$ | $64.00 \pm 0.30$, |
| $Al_2O_3$ | $21.30 \pm 0.20$, |
| $Li_2O$ | $3.50 \pm 0.15$, |
| $Na_2O$ | $0.60 \pm 0.15$, |
| $K_2O$ | $0.50 \pm 0.10$, |
| BaO | $2.50 \pm 0.50$, |
| CaO | $0.20 \pm 0.20$, |
| MgO | $0.10 \pm 0.10$, |
| ZnO | $1.50 \pm 0.50$, |
| $TiO_2$ | $2.30 \pm 0.10$, |
| $ZrO_2$ | $1.60 \pm 0.10$, |
| $MnO_2$ | $0.65 \pm 0.15$, |
| $Fe_2O_3$ | $0.23 \pm 0.03$, |
| CoO | $0.37 \pm 0.05$, |
| NiO | $0.06 \pm 0.02$, and |
| $Sb_2O_3$ | $0.85 \pm 0.15$, | said basic glass having the following characteristics:

| | | |
|---|---|---|
| $\alpha \times 10^7$ (20 to 300° C)° C | = | $43 \pm 1$ |
| $T_g$ (° C); $\eta$ ca. $10^{13.5}$ P | = | $680 \pm 5$ |
| $V_A$ (° C); $\eta = 10^4$ P | = | $1290 \pm 10$ |
| Density (g/cc.) | = | $2.49 \pm 0.05$ |
| position of the DTA-Peak$_{max}$ in ° C at a heating rate of 6 to 6.5° C/min | = | $840 \pm 5$ | that transparent glass ceramic produced from that basic glass by at least one heat treating cycle consisting essentially of:

a. heating the basic glass at a temperature up to 900° C for a sufficient time to obtain that crystalline phase content of at least 30% and not more than 50% by weight and to obtain a heat stress factor R above 1000; and b. cooling the heated glass at a rate of about 1° to 7° C/min within a temperature range of about 900° to 750° C and of about 1 to 200° C/min within a temperature range of 750° C to room temperature;

said crystalline phase content consisting essentially of a member selected from the group consisting of h-quartz solid solutions, h-spodumene, and mixtures thereof, dependent on the number of heat treating cycles employed.

2. A dark red, transparent, glass ceramic according to claim 1, containing only h-spodumene in crystalline phase content said crystalline phase content being not more than 50% by weight, and having a modulus of rupture of about $1680 \pm 50$ kp/cm², the glass having been heat treated through at least five heat treatment cycles.

3. A glass ceramic according to claim 1, having a total crystalline phase content of at least 40%, the size of the crystals being about 400–1000 A.

4. A glass ceramic according to claim 3, having a total crystalline phase content of at least 40%.

5. A glass ceramic according to claim 3, the size of the crystals being about 500–700 A.

6. A glass ceramic according to claim 4, the size of the crystals being about 500–700 A.

7. A glass ceramic according to claim 1 wherein the heat stress factor R is higher than 2500.

8. A glass ceramic according to claim 1 wherein the crystalline content consists essentially of h-quartz solid solutions.

9. A glass ceramic according to claim 1 wherein the crystalline content consists essentially of a mixture of h-quartz solid solutions and h-spodumene.

10. A process for the manufacture of a glass ceramic comprising the steps of:

a. heating a basic glass at 800°–900° C for a sufficient time to obtain said crystalline phase content of at least 30% and not more than 50% by weight; and b. cooling the heated glass at a rate of about 1° to 7° C/min within a temperature range of about 900° to 750° C and of about 1° to 200° C/min within a temperature range of 750° C to room temperature;

said basic glass consisting essentially of in percent by weight calculated on an oxide basis:

| | |
|---|---|
| $SiO_2$ | $64.00 \pm 0.30$, |
| $Al_2O_3$ | $21.30 \pm 0.20$, |
| $Li_2O$ | $3.50 \pm 0.15$, |
| $Na_2O$ | $0.60 \pm 0.15$, |
| $K_2O$ | $0.50 \pm 0.10$, |
| BaO | $2.50 \pm 0.50$, |
| CaO | $0.20 \pm 0.20$, |
| MgO | $0.10 \pm 0.10$, |
| ZnO | $1.50 \pm 0.50$, |
| $TiO_2$ | $2.30 \pm 0.10$, |
| $ZrO_2$ | $1.60 \pm 0.10$, |
| $MnO_2$ | $0.65 \pm 0.15$, |
| $Fe_2O_3$ | $0.23 \pm 0.03$, |
| CoO | $0.37 \pm 0.05$, |
| NiO | $0.06 \pm 0.02$, and |
| $Sb_2O_3$ | $0.85 \pm 0.15$, |

11. A process according to claim 10, comprising 1 to 6 heat treating cycles, the crystalline phase content in the final glass ceramic varying from h-quartz solid solutions to mixtures of same with h-spodumene, to h-spodumene alone, as the number of heat treating cycles are increased.

12. A process for the manufacture of a glass ceramic according to claim 10 comprising the steps of:

melting at about 1620° C a mixture of substantially the following proportions:

| % by weight | |
|---|---|
| 53.30 | sand, |
| 27.15 | hydrated alumina, |
| 1.90 | zirconium silicate, |
| 2.02 | titanium oxide, |
| 7.49 | lithium carbonate, |
| 0.87 | sodium carbonate, |
| 0.62 | potash, |
| 0.39 | dolomite, |
| 1.04 | barium carbonate, |
| 2.16 | barium nitrate, |
| 1.09 | zinc oxide, |
| 0.56 | manganese dioxide, |
| 0.21 | ferric oxide, |
| 0.36 | cobalt oxide, |

-continued

| % by weight | |
|---|---|
| 0.05 | nickel oxide, and |
| 0.73 | antimony oxide | to form a basic glass,
cooling the basic glass to about 1480° C,
shaping the basic glass,
cooling the shaped glass to at least 700° C, and
heat treating the shaped glass.

13. The process according to claim 12, wherein the step of heat treating includes the cycle of:
heating the shaped glass from room temperature to about 800° C at about 10° C/min.,
devitrifying the shaped glass from about 800° C to about 890° C at about 0.5° C/min., and
cooling the devitrified glass from about 890° C to room temperature at about 7° C/min.

14. The process according to claim 13, wherein the cycle of heat treating steps is repeated.

15. The process according to claim 14, wherein the shaped glass is heat treated through six cycles.

* * * * *